US 8,090,746 B2
Jan. 3, 2012

(12) United States Patent
Vignet

(10) Patent No.: US 8,090,746 B2
(45) Date of Patent: Jan. 3, 2012

(54) SYSTEM AND METHOD FOR MAINTAINING CONSISTENT BEHAVIOR WHEN IN DIFFERENT TABLE MODES

(75) Inventor: Peter Vignet, San Francisco, CA (US)

(73) Assignee: SAP Aktiengesellschaft, Walldorf (DE)

( * ) Notice: Subject to any disclaimer, the term of this patent is extended or adjusted under 35 U.S.C. 154(b) by 365 days.

(21) Appl. No.: 11/998,683

(22) Filed: Nov. 29, 2007

(65) Prior Publication Data

US 2009/0144316 A1 Jun. 4, 2009

(51) Int. Cl.
*G06F 7/00* (2006.01)
*G06F 17/30* (2006.01)

(52) U.S. Cl. ......... 707/803; 707/791; 707/796; 715/217

(58) Field of Classification Search .......... 707/100–102, 707/791, 796, 803; 715/217
See application file for complete search history.

(56) References Cited

U.S. PATENT DOCUMENTS

| 5,787,411 | A   | * | 7/1998  | Groff et al. ........................ 707/2    |
| 7,003,504 | B1  | * | 2/2006  | Angus et al. ...................... 707/1    |
| 7,093,005 | B2  | * | 8/2006  | Patterson ....................... 709/220   |
| 7,468,731 | B2  | * | 12/2008 | Eldridge et al. ............... 345/581    |
| 7,613,719 | B2  | * | 11/2009 | Chang et al. ................... 707/102   |
| 2004/0243594 | A1 | * | 12/2004 | Noji ............................... 707/100   |
| 2007/0236509 | A1 | * | 10/2007 | Eldridge et al. .............. 345/619    |
| 2007/0240067 | A1 | * | 10/2007 | Eldridge et al. .............. 715/762    |
| 2007/0240069 | A1 | * | 10/2007 | Eldridge et al. .............. 715/763    |
| 2007/0240070 | A1 | * | 10/2007 | Eldridge et al. .............. 715/763    |
| 2007/0240080 | A1 | * | 10/2007 | Eldridge et al. .............. 715/835    |

* cited by examiner

*Primary Examiner* — Robert Stevens
*Assistant Examiner* — Joshua Bullock
(74) *Attorney, Agent, or Firm* — Blakely, Sokoloff, Taylor & Zafman LLP

(57) ABSTRACT

A system and method are described for maintaining consistent table behavior when in different modes of operation. For example, a computer-implemented method according to one embodiment of the invention comprises: generating a table containing a selection column comprised of selectable cells, the table having a current lead selected row; providing a user with the option to select between an editable mode and a read only mode for the table, wherein, when in the editable mode the user is permitted to edit one or more cells within the table; detecting user input in relation to the table, wherein: if the user selects an editable cell when in the editable mode, allowing the user to edit the contents of the cell without changing the lead selected row; if the user selects a cell in read only mode, maintaining the current lead selected row; and changing to a new lead selected row in both the editable mode and the read only mode only if the user selects the new lead selected row from a cell within the selection column.

21 Claims, 11 Drawing Sheets

Fig. 6

SYSTEM AND METHOD FOR MAINTAINING CONSISTENT BEHAVIOR WHEN IN DIFFERENT TABLE MODES

BACKGROUND

1. Field of the Invention

This invention relates generally to the field of data processing systems. More particularly, the invention relates to a system and method for maintaining consistent behavior when in different table modes.

2. Description of the Related Art

Multi-Tiered Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 1c illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 1c, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, a entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

SUMMARY

A system and method are described for maintaining consistent table behavior when in different modes of operation. For example, a computer-implemented method according to one embodiment of the invention comprises: generating a table containing a selection column comprised of selectable cells, the table having a current lead selected row; providing a user with the option to select between an editable mode and a read only mode for the table, wherein, when in the editable mode the user is permitted to edit one or more cells within the table; detecting user input in relation to the table, wherein: if the user selects an editable cell when in the editable mode, allowing the user to edit the contents of the cell without changing the lead selected row; if the user selects a cell in read only mode, maintaining the current lead selected row; and changing to a new lead selected row in both the editable mode and the read only mode only if the user selects the new lead selected row from a cell within the selection column.

BRIEF DESCRIPTION OF THE DRAWINGS

A better understanding of the present invention can be obtained from the following detailed description in conjunction with the following drawings, in which:

FIG. 6 illustrates a table operating in read only mode according to one embodiment of the invention.

DETAILED DESCRIPTION OF PREFERRED EMBODIMENTS

Described below is a system and method for maintaining consistent behavior when in different table modes. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1A:
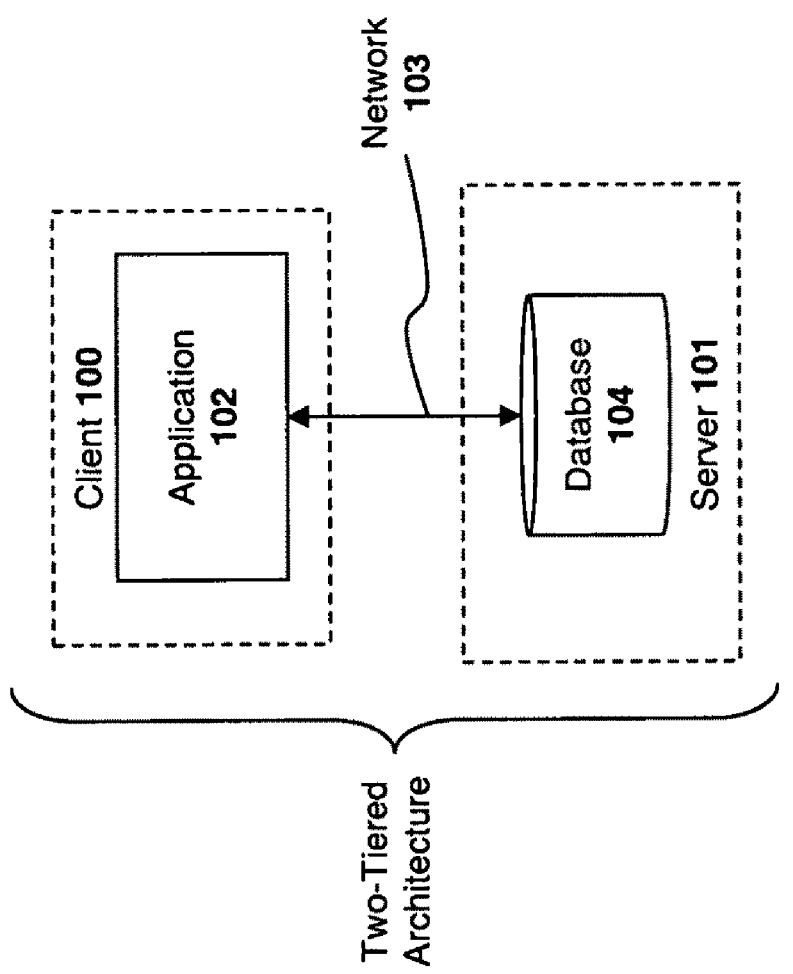
FIG. 1a illustrates a traditional two-tier client-server architecture.
Figure 1B:
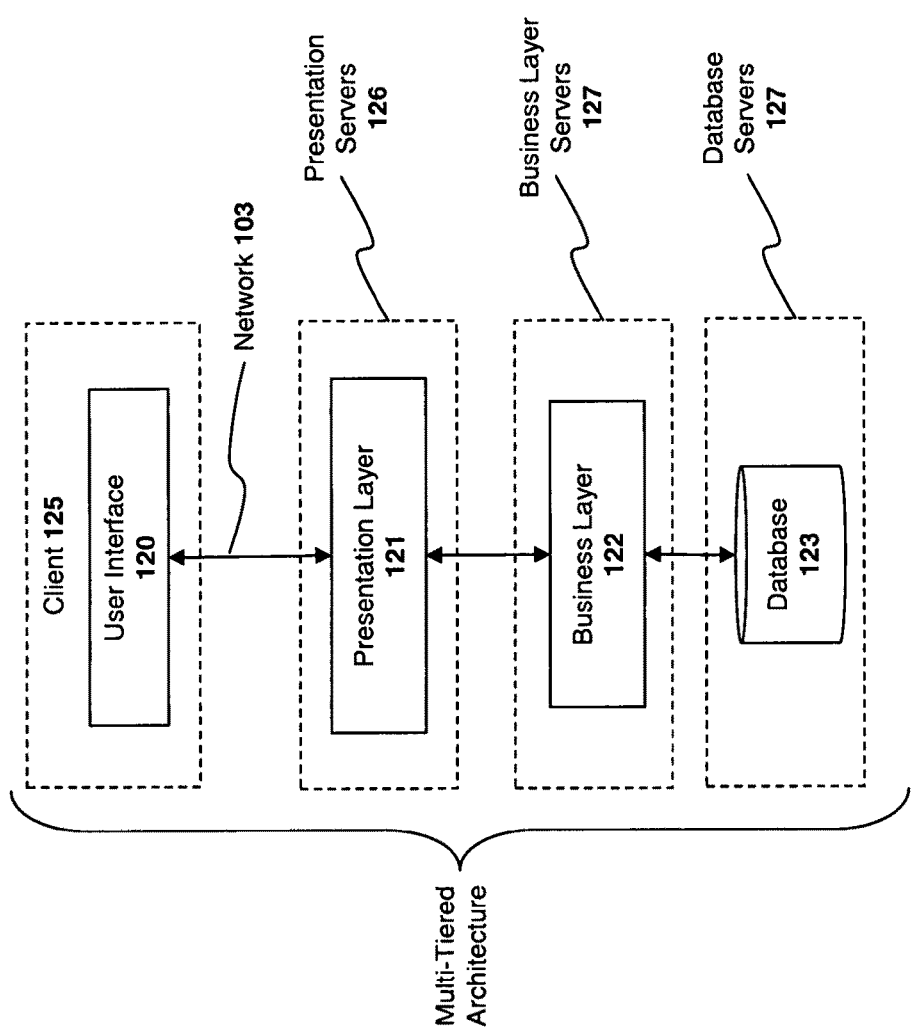
FIG. 1b illustrates a prior art multi-tier client-server architecture.
Figure 1C:
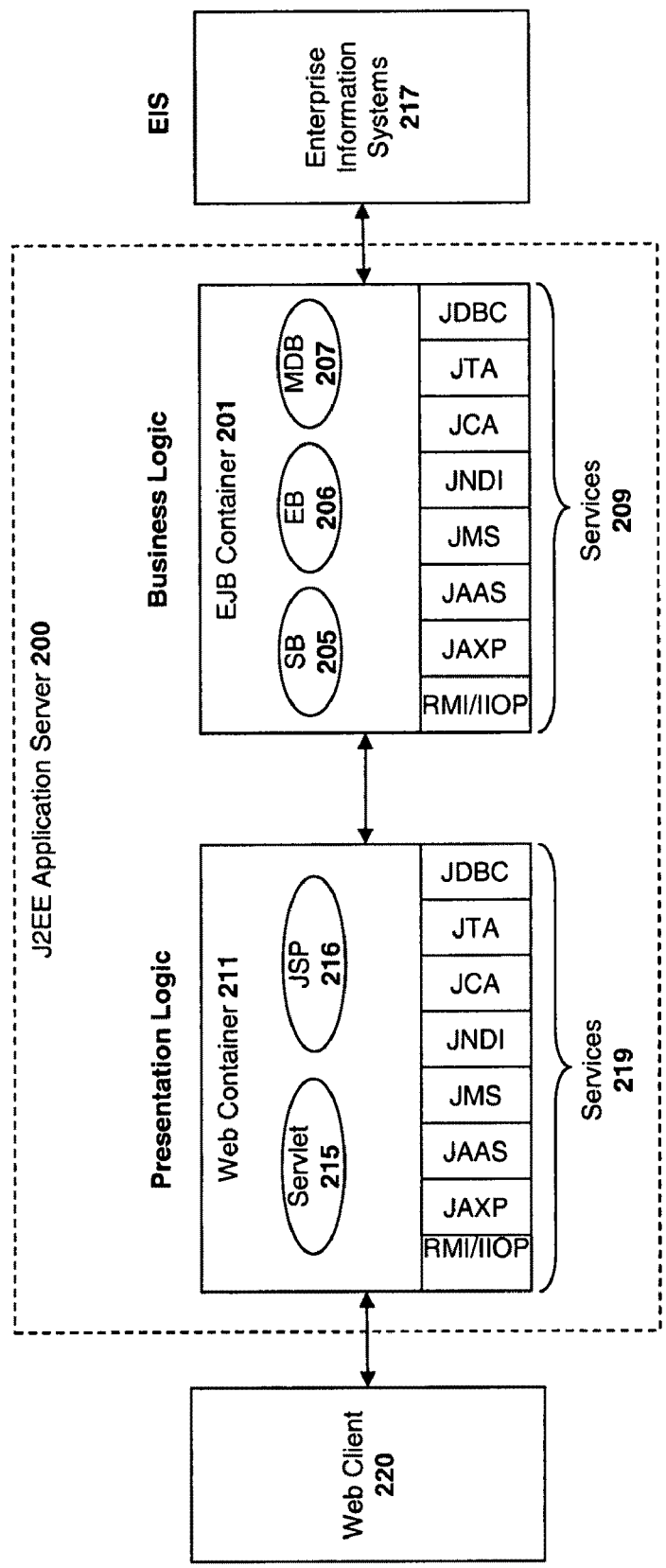
FIG. 1c illustrates a multi-tiered application server architecture according to the Java 2 Enterprise Edition ("J2EE") standard.
Figure 2:
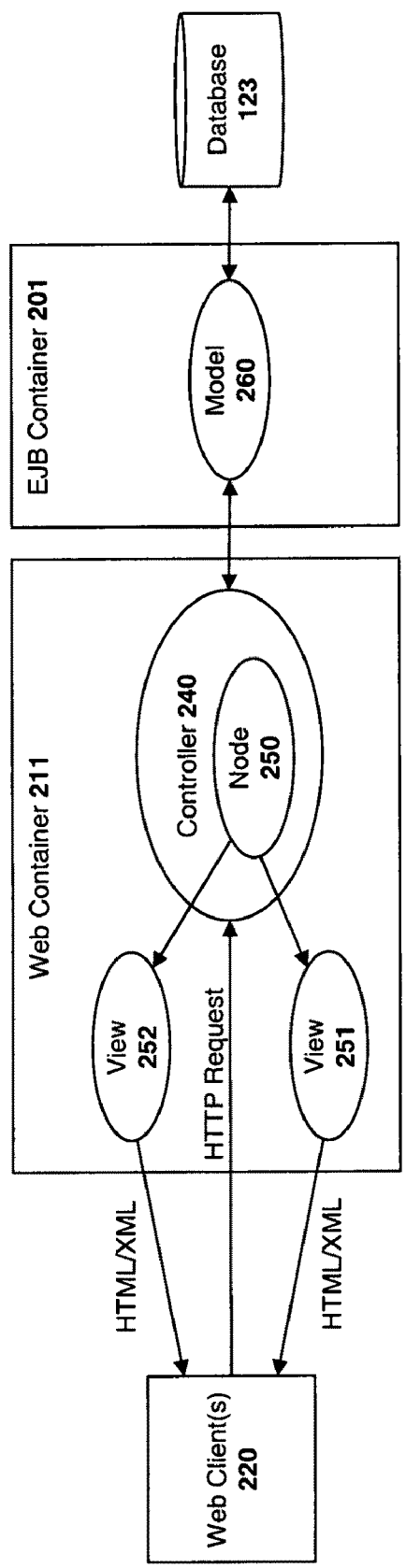
FIG. 2 illustrates a model view controller ("MVC") architecture implemented in accordance with one embodiment of the invention.

The display of data records in tables and forms, and the associated editing of the tables and forms (e.g., selecting, deleting, sorting, etc) by clients are central functions in Web-based applications. Thus, various techniques are provided within the J2EE architecture for creating and working with tables in response to client requests. In particular, under a model-view-controller ("MVC") architecture, illustrated in FIG. 2, Web-based content using tables may be created within the Web Container 211 using "controllers" 240 and "views" 251-252 that operate in conjunction with "models" 260 within the EJB container 201. A detailed description of the MVC architecture is beyond the scope of the present application but, briefly, the controller 240 manages the underlying table structure and data, referred to in FIG. 2 as a context node 250. The table structure is presented to Web clients 220 in the form of one or more "views" 251-252 which indicate, for example, how the table is presented within a Web page. Controllers may be implemented by servlets and views by Java server pages. The model 260 within the EJB container 201 provides an interface between the controller 240 and the underlying table data stored within the database 123. See, e.g., GHALY and KOTHAPALLI mentioned above for additional detail on the MVC architecture at pages 148-152.

The view 252, 251 may be a table, in which case the table receives its data from a "multi element context node." At runtime, each element of the node is mapped to a table row. Thus, the number of table rows is identical to the number of node elements. The table columns are mapped to the context node attributes.

The context node 250 may be filtered and/or otherwise modified in response to requests from Web clients. For example, as part of a search request a Web client may designate a filtering operation such as "only display client records in the table beginning with the letters DE" or "only display client records with a value of 1000." As a result the table node will be filtered and the results provided to the client in the form of a filtered table.

Various existing application server platforms employ a Model View Controller architecture to generate views for requesting clients. For example, "Web Dynpro" is a programming paradigm developed by SAP AG (the assignee of the present application) which implements a Model View Controller architecture for generating and displaying views (e.g., tables) to end users. While certain embodiments of the invention are described herein within the context of Web Dynpro, it should be noted that the underlying principles of the invention are not limited to any particular programming paradigm.

Figure 3:
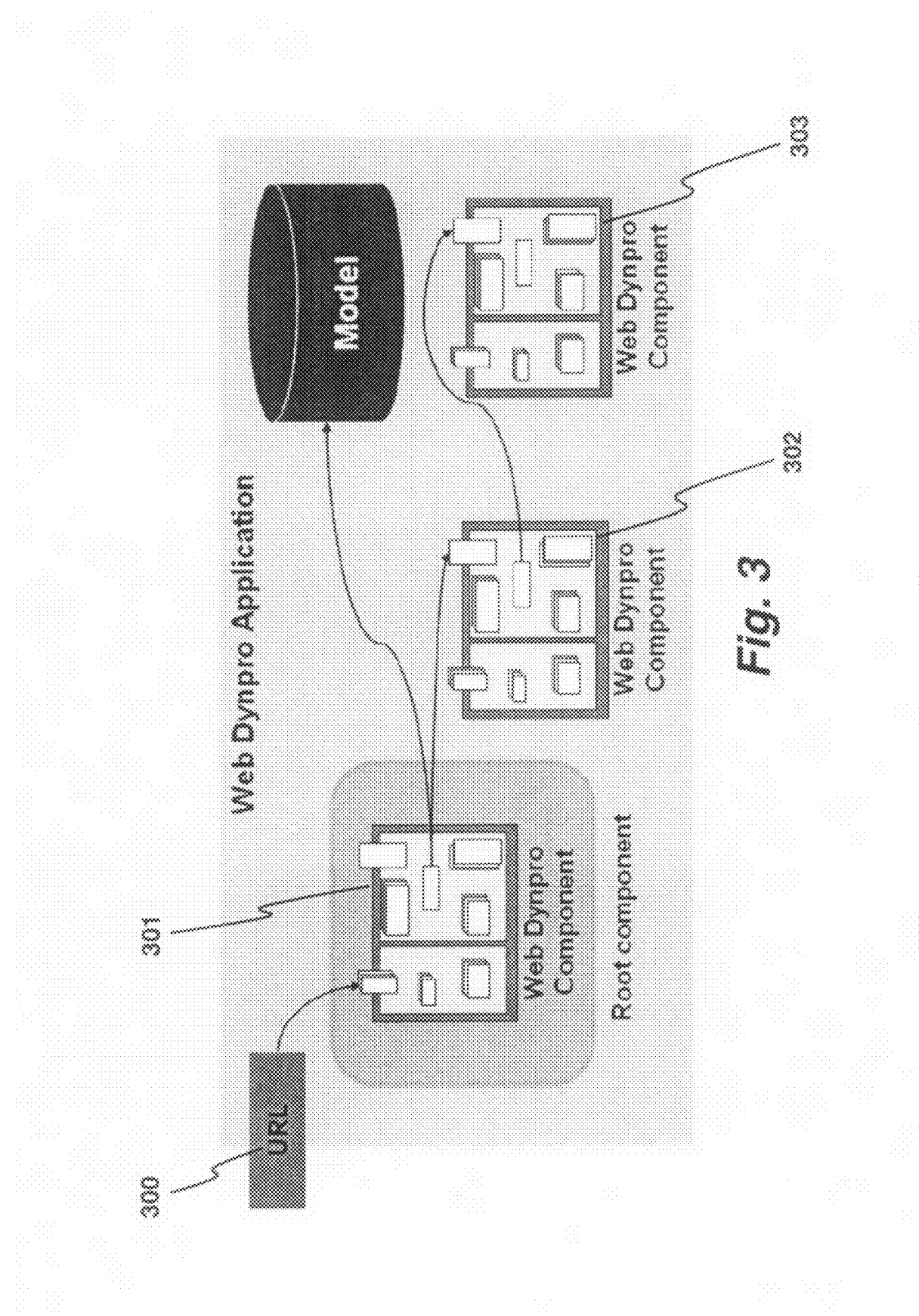
FIG. 3 illustrates different sets of re-usable components employed within an application.

Web Dynpro is built on the model video controller (MVC) concept which is described briefly above. As used herein a Web Dynpro "component" is a reusable set of controllers, views, and model usage declarations that have been aggregated for the specific purpose of reuse for many different applications. Consequently a component is not only a reusable unit of code at the technical coding level, but it is also a reusable unit of code at the business process level. A component may use other components. An application defines a Uniform resource Locator (URL) that is the entry point to one of its components. In the example illustrated in FIG. 3, an application utilizes three separate components 301-303. The entry point component 301 to which the URL points is typically referred to as the "Root" component.

Figure 4:
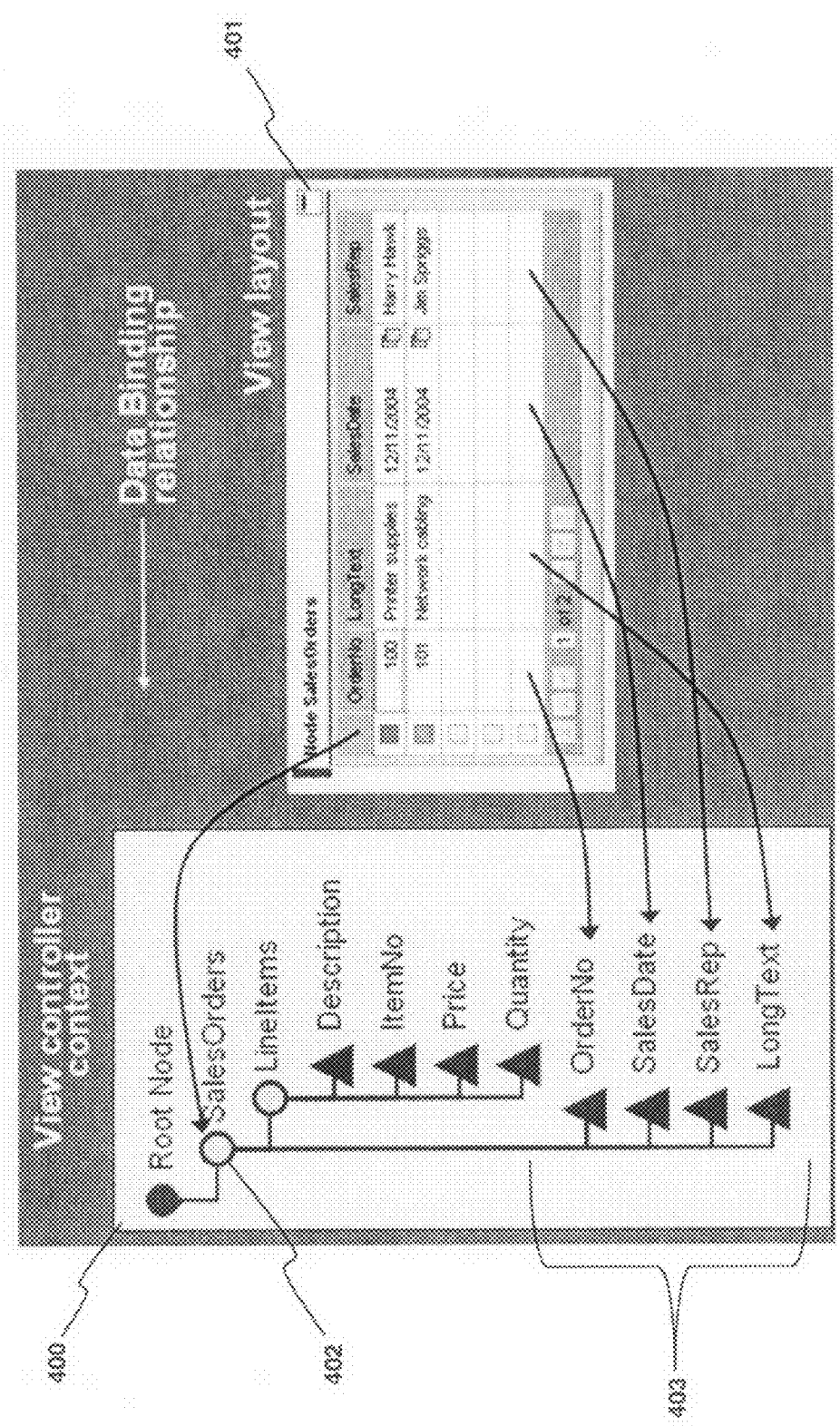
FIG. 4 illustrates how a table is mapped to a view controller context in one embodiment of the invention.

In one embodiment, tools are provided to developers that help build applications and components. Referring to FIG. 4, a table view 401 is created from user interface (UI) elements and a table is mapped to data from the view context 400. In the above figure, the selected row (referred to as the "lead selected row" or "lead selection") points to the lead selected element 402 of the context node 400. The columns of the table view 401 correspond to the attributes 403 of the lead selected element 402.

Different table "modes" are available to end users including a "read only" mode and an "editable" mode. Table behavior may be inconsistent depending on whether the table is in "read only" mode or "editable mode." By way of example, in FIG. 5 a table 505 is in editable mode as indicated by drop down menu 503 (showing that readOnly=False). A lead row 500 is initially selected by the user by clicking on a selection cell within the first column of the table 505. Upon selection, editable details associated with the selection row are provided within a separate window 501. The user may choose to update the details via the window 501. If the user selects an element from a different row 502 which is editable, the lead selection row 500 and details window 501 does not change. In this case, the user may edit the selected cell directly.

Figure 6:
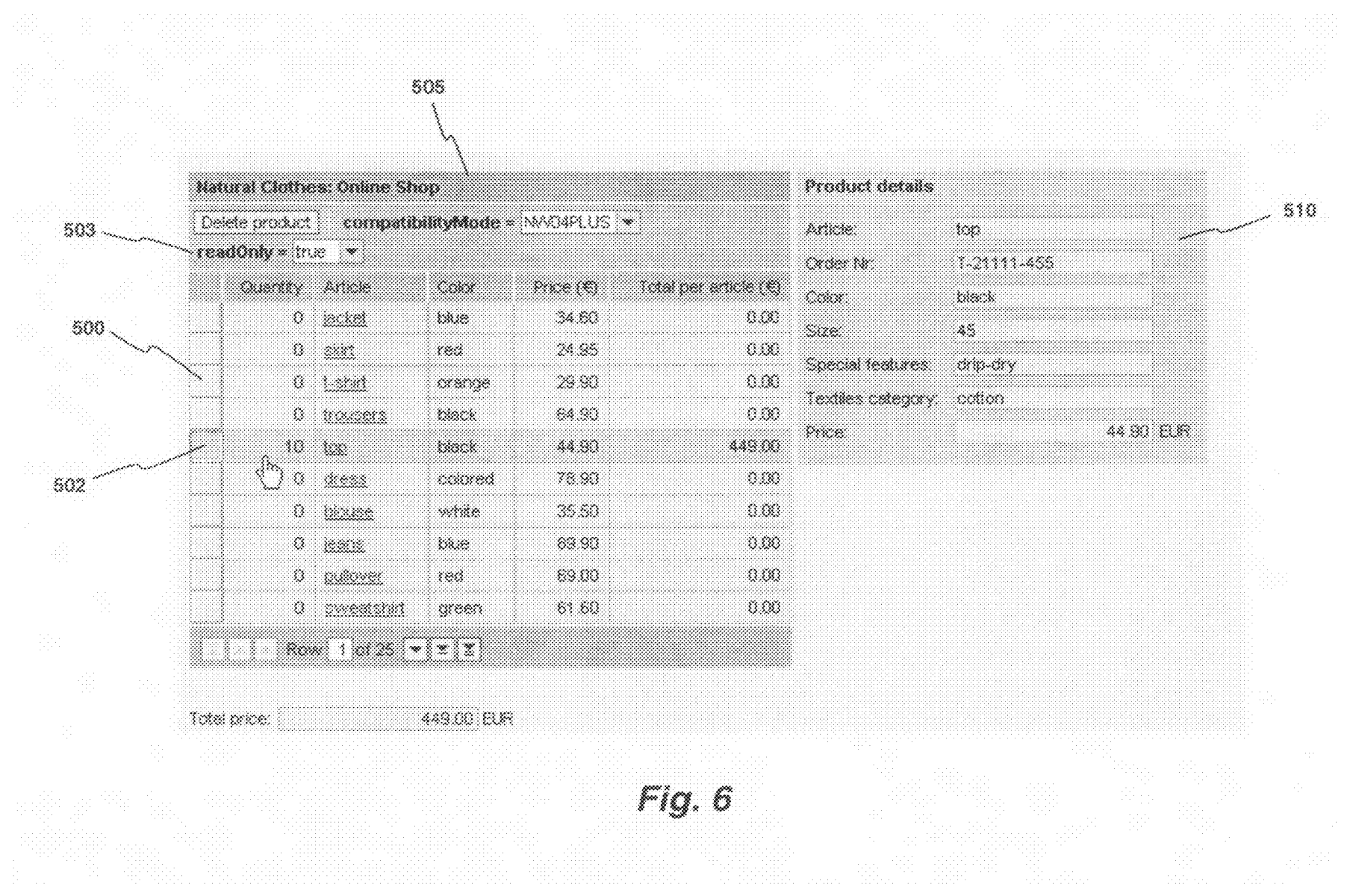

By contrast, in FIG. 6 the table 505 is in read only mode as indicated by drop-down menu 503 (showing readOnly=true). In this mode, when the user selects a cell from within a new row 502, the new row automatically becomes the lead selection row and the details within the additional window 510 are changed to correspond to the new selection row 502. In this example, the user is not permitted to edit the cell directly within the new lead selection row 502.

Thus, when in editable mode, table performance is improved because the user can update a cell that does not belong to the lead row significantly faster without additional round trips to the server to update information related to the lead selection row. To change the lead selection row, the user must select the selection cell of the row within the first column. However if the table is in read only mode, the behavior of the table is different. If a user selects any cell within a row, the row becomes the new lead selection row and the details window is updated accordingly. When switching between the different table modes, the end user has to remember that the interactive table behavior has changed.

This inconsistency becomes more inopportune and critical when a table is used within a reusable component. Given that a component may be used and reused in multiple applications, the inconsistency of this behavior can be quite cumbersome and undesirable for the end user. For example, the end user may trigger an unwanted table reaction because he forgot that the table behaves differently according its mode. Consequently the gain in performance may be offset by the result of user errors while interacting with the table.

Figure 5:
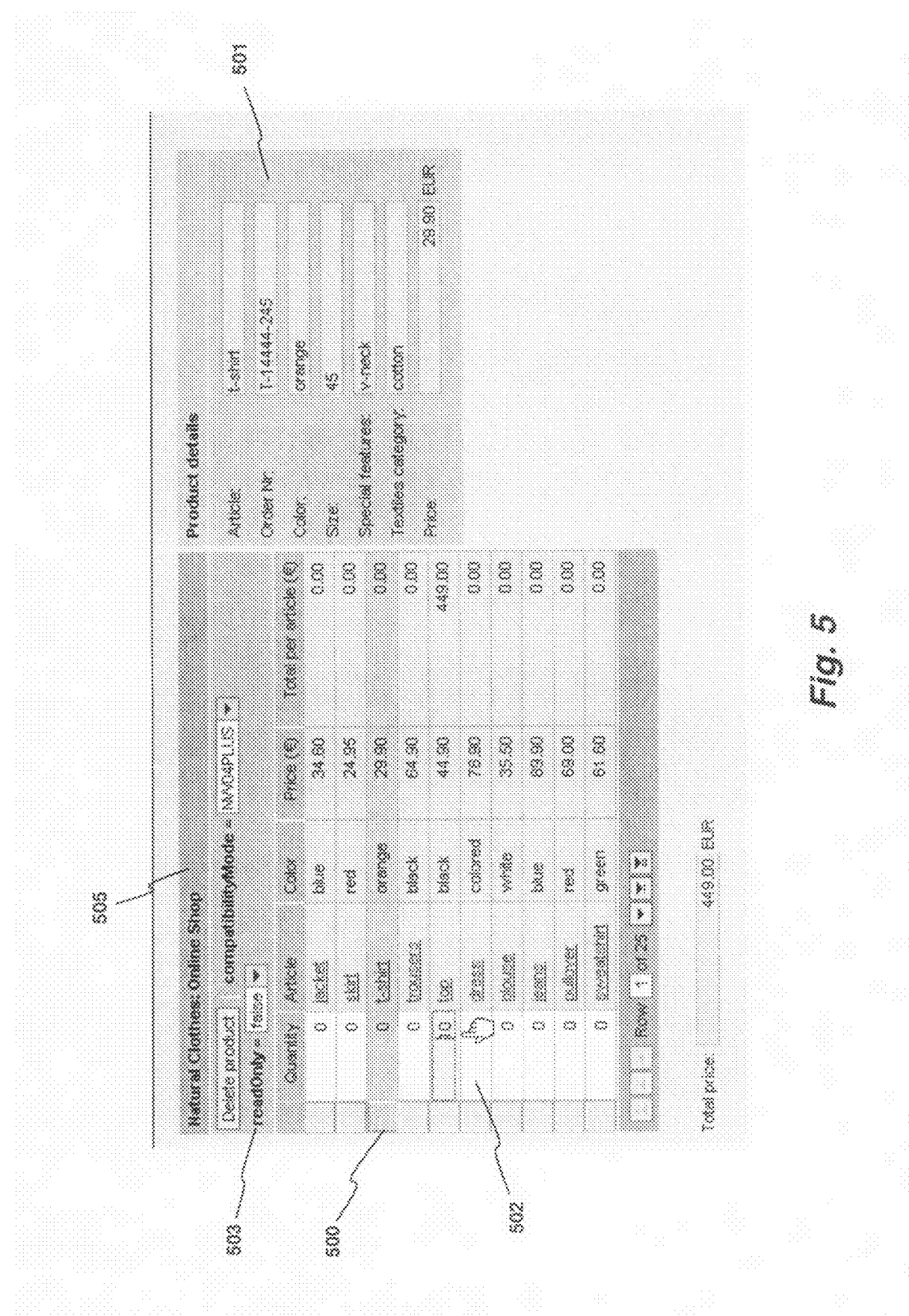
FIG. 5 illustrates a table operating in editable mode according to one embodiment of the invention.

One embodiment of the invention solves these deficiencies by providing consistent table behavior in both the editable and read only modes. Specifically, the same interactive behavior of the table is maintained in both read only mode and editable mode. In this embodiment, the lead row selection is changed in both modes only by using the selection column within the table. In FIGS. 5 and 6, the selection column is the first column of the table. If the user selects a cell within editable mode, the cell is highlighted (if it is editable) and the user may modify the cell contents but the lead selection is unchanged. If the user selects the cell when in read only mode, the user may not modify the cell and the lead selection row remains unchanged. To change the lead selection row when in read only mode, the user must select the row via the selection column.

Figure 7A:
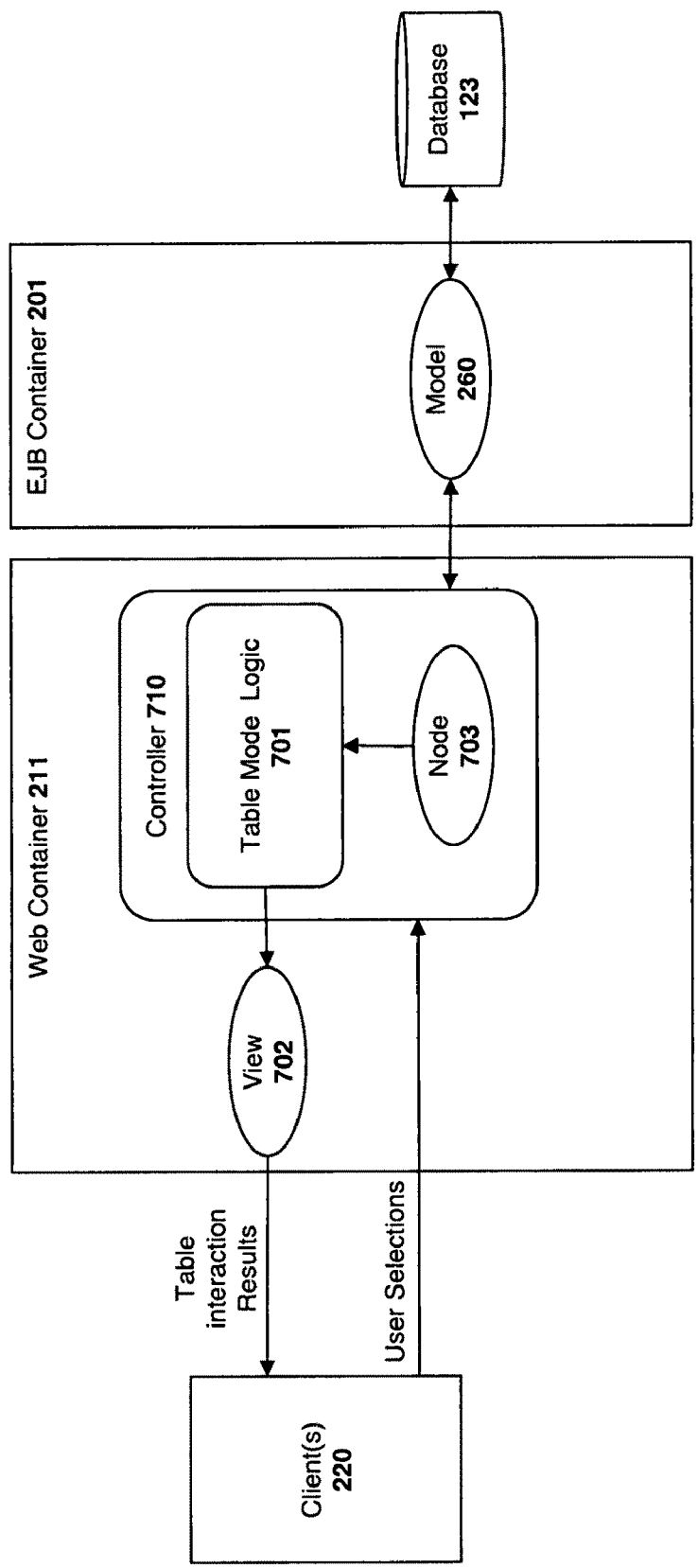
FIG. 7a illustrates a system architecture according to one embodiment of the invention.

An architecture according to this embodiment of the invention is illustrated in FIG. 7a which shows a controller 710 within a model view controller architecture generating a table view 702 in response to user selections. The controller 710 of this embodiment includes table mode logic 701 for manipulating table data within a node 703 (e.g., a multi-element context node) to generate tables having consistent behavior between different modes of operation as described above. In one embodiment, the client 220 sends requests and receives responses using the Hypertext Transport Protocol (HTTP). However, the underlying principles of the invention are not limited to any particular protocol.

Figure 7B:
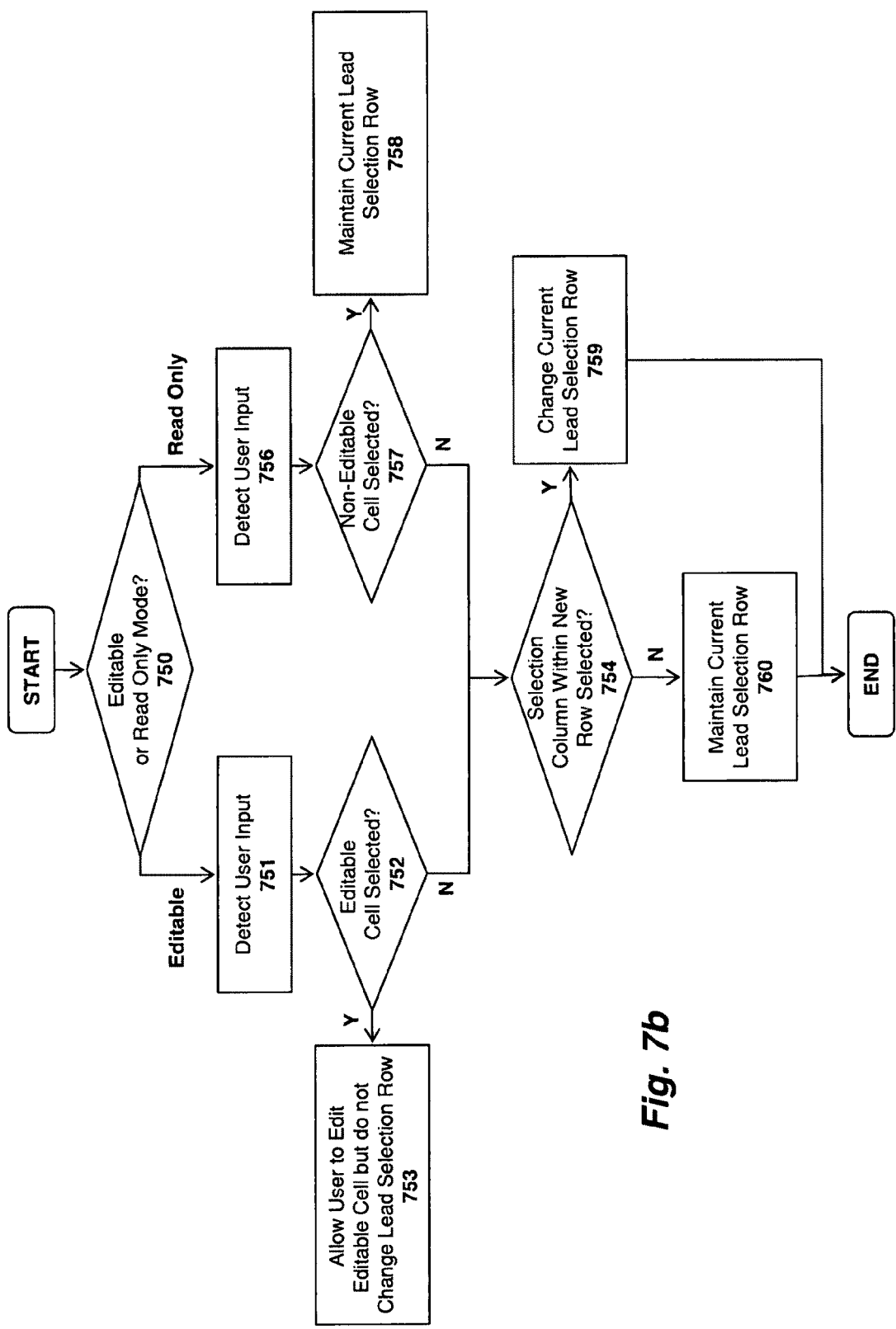
FIG. 7b illustrates a method architecture according to one embodiment of the invention.

A method implemented by one embodiment of the table mode logic 701 to maintain consistent table behavior is illustrated in FIG. 7b. At 750 a determination is made as to whether the current table mode selected by the user is "editable" or "read only." If the table is in editable mode, then in response to a detected user input at 751, a determination is made at 752 as to whether an editable cell has been selected by the user. If so, then the user is permitted to edit the cell but the lead selection row remains unchanged at 753. If not, then at 754, a determination is made as to whether the user has selected a cell from the selection column of a new row. If so, then the current lead selection row is changed at 759. If not, then the current lead selection row is maintained at 760.

If the table is in read only mode, then in response to a detected user input at 756, a determination is made at 757 as to whether a non-editable cell has been selected by the user. If so, then the lead selection row remains unchanged at 758. If not, then at 754, a determination is made as to whether the user has selected a cell from the selection column of a new row. If so, then the current lead selection row is changed at 759. If not, then the current lead selection row is maintained at 760.

Figure 8:
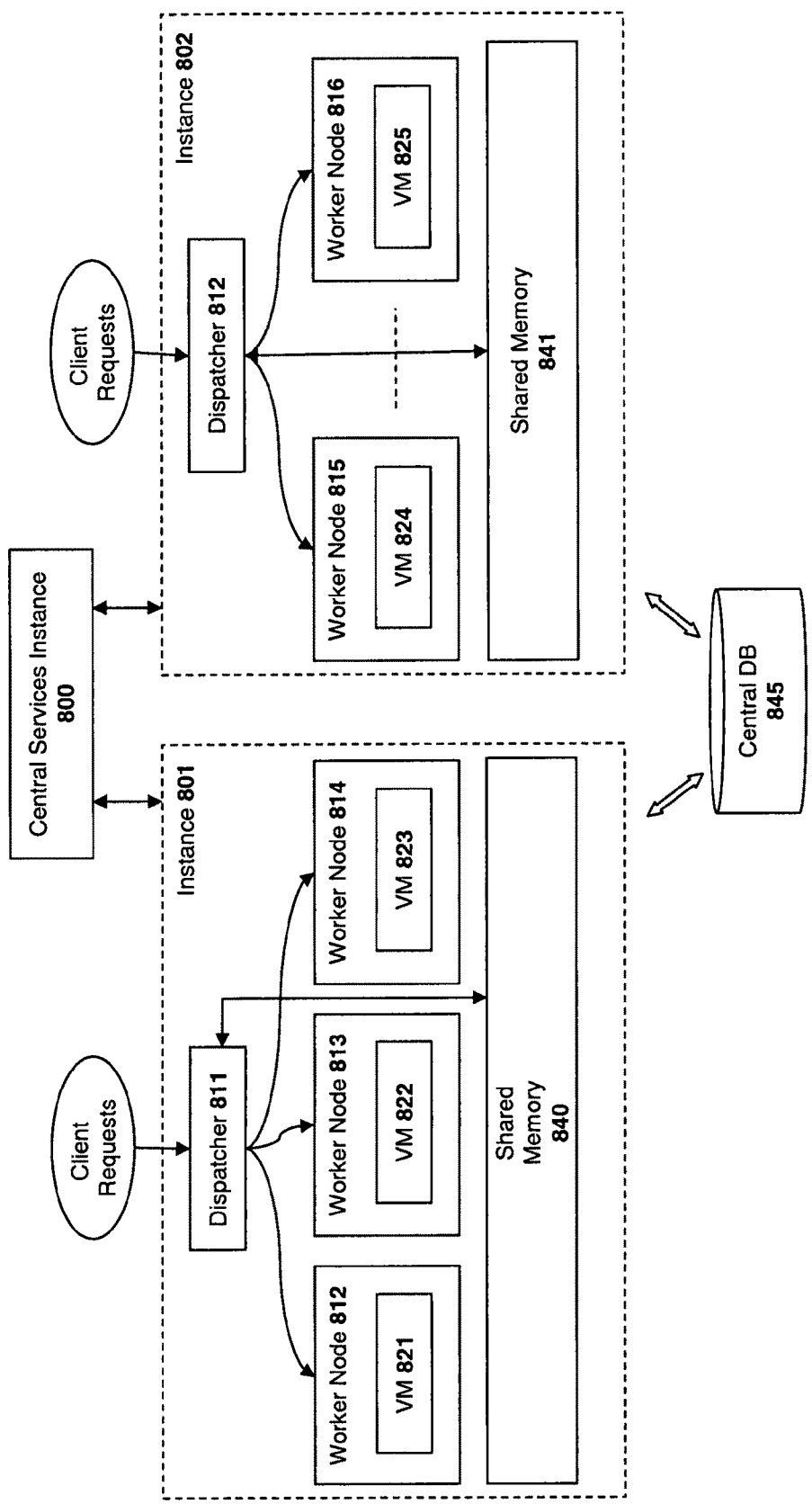
FIG. 8 illustrates an application server architecture on which embodiments of the invention may be implemented.

A system architecture on which embodiments of the invention may be implemented is illustrated in FIG. 8. The architecture includes a plurality of application server "instances" 801 and 802. The application server instances 801 and 802 each include a group of worker nodes 812-814 and 815-816 (also sometimes referred to herein as "server nodes"), respectively, and a dispatcher 811 and 812, respectively. The application server instances 801, 802 communicate through a central services instance 800 using message passing. In one embodiment, the central services instance 800 includes a locking service and a messaging service (described below). The combination of all of the application server instances 801 and 802 and the central services instance 800 is referred to herein as a "cluster." Although the following description will focus solely on instance 801 for the purpose of explanation, the same principles apply to other instances within the cluster.

The worker/server nodes 812-814 within instance 801 provide the business and presentation logic for the network applications supported by the system including, for example, the model-video controller architecture described herein. Each of the worker nodes 812-814 within a particular instance may be configured with a redundant set of programming logic and associated data, represented as virtual machines 821-823 in FIG. 8. In one embodiment, the dispatcher 811 distributes service requests from clients to one or more of the worker nodes 812-814 based on the load on each of the servers. For example, in one embodiment, the dispatcher maintains separate queues for each of the 812-814 in a shared memory 840. The dispatcher 811 fills the queues with client requests and the worker nodes 812-814 consume the requests from each of their respective queues. The client requests may be from external clients (e.g., browser requests) or from other components/objects within the instance 801 or cluster.

In one embodiment, the worker nodes 812-814 may be Java 2 Enterprise Edition ("J2EE") worker nodes which support Enterprise Java Bean ("EJB") components and EJB containers (at the business layer) and Servlets and Java Server Pages ("JSP") (at the presentation layer). In one embodiment, JSPs are used to implement the different views 702 described above, and servlets are used to implement the controllers 710. In this embodiment, the virtual machines 821-825 implement the J2EE standard (as well as the additional non-standard features described herein). It should be noted, however, that certain high-level features described herein may be implemented in the context of different software platforms including, by way of example, Microsoft .NET platforms and/or the Advanced Business Application Programming ("ABAP") platforms developed by SAP AG, the assignee of the present application.

In one embodiment, communication and synchronization between each of the instances 801, 802 is enabled via the central services instance 800. As mentioned above, the central services instance 800 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 845. The locking service locks data on behalf of various system components which need to synchronize access to specific types of data and program code. In one embodiment, the central services instance 800 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects across virtual machines 821-825. Specifically, in one embodiment, objects such as session objects which are identified as "shareable" are stored within a shared memory region 840, 841 and are made accessible to multiple virtual machines 821-825. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 840, 841 or "heap" is used to store data objects that can be accessed by multiple virtual machines 821-825. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the invention, objects are not put into the shared memory heap by themselves—rather, objects (such as the session objects described herein) are put into the shared memory heap in groups known as "shared closures." A shared closure is an initial object plus the transitive closure of all the objects referenced by the initial object.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Web Dynpro, Java or J2EE implementation, the underlying principles of the invention may be implemented in virtually any client-server environment. Moreover, although some of the embodiments set forth above are implemented within a shared memory environment, the underlying principles of the invention are equally applicable to a non-shared memory environment. Finally, it should be noted that the terms "client" and "server" are used broadly to refer to any applications, components or objects which interact over a network.

Accordingly, the scope and spirit of the invention should be judged in terms of the claims which follow.

What is claimed is:

1. A computer-implemented method comprising:
generating a table containing a plurality of data columns and a selection column, the plurality of data columns separate from the selection column, the selection column comprised of selectable cells, a selectable cell when marked designating a current lead selected row where the entire current lead selected row is highlighted and data from the current lead selected row is displayed in a window separate from the table;
providing a user with the option to select between an editable mode and a read only mode for the table, wherein, when in the editable mode the user is permitted to edit one or more cells within the table;
detecting user input in relation to the table, wherein:
if the user selects an editable cell when in the editable mode, allowing the user to edit the contents of the editable cell without changing the current lead selected row;
if the user selects a cell in read only mode, maintaining the current lead selected row; and
changing to a new lead selected row by a computer system in both the editable mode and the read only mode only if the user selects the new lead selected row by marking a different selectable cell within the selection column.

2. The method as in claim 1 wherein providing a user with the option to select between an editable mode and a read only mode for the table comprises providing a drop-down menu having from which the user may select the editable mode or the read only mode.

3. The method as in claim 1 wherein, in response to detecting a new lead selected row:
highlighting the entire new lead selected row;
retrieving additional data from a server related to the new lead selected row; and
displaying the additional data within a window separate from the table.

4. The method as in claim 3 wherein, when in editable mode, the additional data is displayed within data fields which are editable by the end user.

5. The method as in claim 1 further comprising:
transmitting any edits made by the end user to a server; and
storing the edits within a database.

6. The method as in claim 1 wherein generating a table comprises:
retrieving data from a model within a model-view-controller architecture; and
generating a view comprised of the table with the data.

7. The method as in claim 1 wherein the current or new lead selected row points to a lead selected element within a context node and wherein the columns of the table correspond to attributes of the lead selected element.

8. A system comprising a memory for storing program code and a processor for processing the program code to perform the operations of:
generating a table containing a plurality of data columns and a selection column, the plurality of data columns separate from the selection column, the selection column comprised of selectable cells, a selectable cell when marked designating a current lead selected row where the entire current lead selected row is highlighted and data from the current lead selected row is displayed in a window separate from the table;

providing a user with the option to select between an editable mode and a read only mode for the table, wherein, when in the editable mode the user is permitted to edit one or more cells within the table;

detecting user input in relation to the table, wherein:

if the user selects an editable cell when in the editable mode, allowing the user to edit the contents of the editable cell without changing the current lead selected row;

if the user selects a cell in read only mode, maintaining the current lead selected row; and changing to a new lead selected row in both the editable mode and the read only mode only if the user selects the new lead selected row by marking a different selectable cell within the selection column.

9. The system as in claim 8 wherein providing a user with the option to select between an editable mode and a read only mode for the table comprises providing a drop-down menu having from which the user may select the editable mode or the read only mode.

10. The system as in claim 8 comprising additional program code which causes the processor to perform the operations of:

highlighting the entire new lead selected row;

retrieving additional data from a server related to the new lead selected row; and displaying the additional data within a window separate from the table.

11. The system as in claim 10 wherein, when in editable mode, the additional data is displayed within data fields which are editable by the end user.

12. The system as in claim 8 comprising additional program code which causes the processor to perform the operations of:

transmitting any edits made by the end user to a server; and storing the edits within a database.

13. The system as in claim 8 wherein generating a table comprises:

retrieving data from a model within a model-view-controller architecture; and generating a view comprised of the table with the data.

14. The system as in claim 8 wherein the current or new lead selected row points to a lead selected element within a context node and wherein the columns of the table correspond to attributes of the lead selected element.

15. A non-transitory machine-readable storage medium having program code stored thereon which, when executed by a machine, causes the machine to perform the operations of:

generating a table containing a plurality of data columns and a selection column, the selection column separate of any column containing data, the selection column comprised of selectable cells, a selectable cell when marked designating a current lead selected row where the entire current lead selected row is highlighted and data from the current lead selected row is displayed in a window separate from the table concurrently with the table;

providing a user with the option to select between an editable mode and a read only mode for the table, wherein, when in the editable mode the user is permitted to edit one or more cells within the table;

detecting user input in relation to the table, wherein:

if the user selects an editable cell when in the editable mode, allowing the user to edit the contents of the editable cell without changing the current lead selected row;

if the user selects a cell in read only mode, maintaining the current lead selected row; and changing to a new lead selected row in both the editable mode and the read only mode only if the user selects the new lead selected row by marking a different selectable cell within the selection column.

16. The non-transitory machine-readable storage medium as in claim 15 wherein providing a user with the option to select between an editable mode and a read only mode for the table comprises providing a drop-down menu having from which the user may select the editable mode or the read only mode.

17. The non-transitory machine-readable storage medium as in claim 15 comprising additional program code which causes the machine to perform the operations of:

highlighting the entire new lead selected row;

retrieving additional data from a server related to the new lead selected row; and displaying the additional data within a window separate from the table.

18. The non-transitory machine-readable storage medium as in claim 17 wherein, when in editable mode, the additional data is displayed within data fields which are editable by the end user.

19. The non-transitory machine-readable storage medium as in claim 15 comprising additional program code which causes the processor to perform the operations of:

transmitting any edits made by the end user to a server; and storing the edits within a database.

20. The non-transitory machine-readable storage medium as in claim 15 wherein generating a table comprises:

retrieving data from a model within a model-view-controller architecture; and generating a view comprised of the table with the data.

21. The non-transitory machine-readable storage medium as in claim 15 wherein the current or new lead selected row points to a lead selected element within a context node and wherein the columns of the table correspond to attributes of the lead selected element.

\* \* \* \* \*